United States Patent Office 3,823,116
Patented July 9, 1974

3,823,116
PROCESS FOR PRODUCING COPOLYMERS OF VINYL CHLORIDE WITH ACRYLIC ACID ESTERS
Lorenzo Ratti, Chiavenna, and Francesco Visani, Milan, Italy, assignors to Montecatini Edison S.p.A., Milan, Italy
Filed Mar. 10, 1972, Ser. No. 233,720
Claims priority, application Italy, Mar. 12, 1971, 21,678/71
Int. Cl. C08g 15/26
U.S. Cl. 260—63 HA                 7 Claims

ABSTRACT OF THE DISCLOSURE

There is disclosed a process for producing copolymers of vinyl chloride with acrylic acid esters which comprises polymerizing a mixture of vinyl chloride, carbon monoxide and a compound containing alcoholic functions in contact with an initiator or catalyst of the radicalic type, such as a peroxide, azo-compound, redox system, or the like.

THE PRIOR ART

The reaction of vinyl chloride with carbon monoxide has been described in USP No. 2,495,286; by M. Otsuka et al. in "Die Makromol. Chem.," *103* 291 (1967); by L. Wintraub et al. in "Chemistry and Industry," Nov. 27, 1965, page 1976; and in Canadian Pats. 837,590 and 837,726. In U.S. Pat. 2,495,286, the structure of polyketones has been ascribed to the polymerization products obtained by the polymerization of vinyl chloride and carbon monoxide.

THE PRESENT INVENTION

It is found, unexpectedly, in accordance with this invention, that copolymers of vinyl chloride and acrylic acid esters can be prepared by the radicalic polymerization of mixtures of vinyl chloride and carbon monoxide which also contain a compound containing alcoholic functions.

Suitable compounds containing alcoholic functions are e.g. mono- and poly-hydric alcohols, such as methyl alcohol, ethyl alcohol, 2-ethylhexylalcohol, 2-phenylethylalcohol, cyclohexanol, ethylenes glycol and glycerol, hydroxyacids, such as 10-hydroxy-decanoic acid, gamma-hydroxy-butyric acid, alpha- and beta-hydroxy-propionic acids.

Preferably, the polymerization of the mixture consisting of vinyl chloride, carbon monoxide and the compound containing the alcoholic function is carried out at a temperature in the range from 0° C. to 60° C. at operating pressures comprised between 5 and 300 kg./cm.$^2$ However, neither the temperature nor pressure is critical, since temperatures below 0° C. and above 60° C. and pressures higher than 300 kg./cm.$^2$ may be used. It is possible, for instance, to operate both at −40° C. and at +70° C.

In principle, the amount of the compound containing alcoholic functions to be used will be related to the amount of COCl groups which form during the copolymerization and which partake in esterification reaction.

The concentration of the compound containing alcoholic functions in the reaction system is preferably comprised between 0.2 and 20% by weight on the vinyl monomer.

Any of the initiators of the radicalic type may be used as copolymerization initiators, such as peroxides (e.g. benzoylperoxide, laurylperoxide, isopropylperoxidicarbonate, bicyclohexylperoxydicarbonate, tert.-butylperoxyoxalate, sec.-butyl-tert.butylperoxyoxalate), azocompounds (e.g. azoiso butyrronitrile, 2,2′-azobis(2,4-dimethyl)valeronitrile), redox systems.

The copolymerization reaction can be carried out in the absence of a solvent and the copolymer which is formed in the absence of a solvent can be recovered as a solid at the end of the reaction. However, the copolymerization reaction can also be carried out in an inert diluent from which the copolymer precipitates or in a solvent in which the copolymer is partially or completely soluble.

In alternative, the present process can be carried out in 2 steps: in the first step anhydrous vinylchloride is reacted with carbon monoxide in the absence of the compound containing alcoholic functions; in the second step, the thus obtained copolymer is reacted with the compound containing the alcoholic functions to give the vinylchloride-acrylic acid ester copolymers.

The present process has various advantages as compared to the known industrial methods for preparing copolymers having a homogeneous structure from vinyl chloride and acrylic acid esters, and starting with the corresponding monomers.

As is known, the reactivity ratios of vinyl chloride and acrylic monomers are generally very different, with the result that the acrylic monomer enters the growing polymeric chain much more rapidly than the vinyl chloride. Attempts have been made to compensate for the different reactivity ratios of vinyl chloride and the acrylic monomer by controlling the rate of feed of the acrylic monomer to the reaction zone, that is by introducing the acrylic monomer gradually during the copolymerization reaction. However, the realization of a homogeneous distribution of the acrylic monomer in the reaction medium still presents various difficulties because of the high viscosity or heterogeneity of the reaction medium itself.

The present process, which utilizes carbon monoxide as one starting comonomer, instead of an acrylic derivative, and in which the copolymerization is effected in the presence of a compound containing alcoholic functions, has economic advantages arising from the low cost of carbon monoxide. Moreover, this process has the technical advantage that the carbon monoxide concentration in the monomers mixture, and consequently the composition of the copolymer of vinyl chloride and acrylic acid ester which is formed, can be kept constant very easily by adjusting the carbon monoxide pressure in the system.

The following examples are given to illustrate the invention and are not intended to be limiting.

Example 1

This example is given in order to show the structure of the product obtained by copolymerizing vinyl chloride with carbon monoxide. 1 g. of a 10% (weight/volume) solution of tert.-butylmonoperoxalate in n-pentane, 10 g. of vinyl chloride and carbon monoxide up to a pressure of 105 kg./cm.$^2$, at a temperature of 25° C., are introduced into a 250 cc. rocking autoclave. 12.2 g. of polymer are discharged after a 3-hour polymerization at said temperature.

The polymer thus obtained exhibits the same structure as the vinyl chloride-acrylyl chloride copolymer. This fact is proved by the following:

(a) identity of the infrared spectrum. In particular, an intense band at 1785 cm.$^{-1}$ due to the carbonyl in the

group (carboxylic acid chloride) is present in the spectrum besides the bands characteristic of the PVC;
(b) reactions characteristic of a carboxylic acid chloride. For instance, by reacting the polymer obtained from CO-vinyl chloride mixtures with methyl alcohol, a product is obtained which is identical with the vinyl chloride-methyl acrylate copolymer; in the infrared spectrum a strong band can be noticed at 1733 cm.$^{-1}$, which is attributable to the carbonyl of an ester, while the band at 1785 cm.$^{-1}$ is not present. Such spectrum is identical with that of a vinyl chloride-methyl acrylate copolymer.

The percentage of

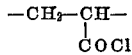

units present in the copolymer vinylchloride-acrylyl chloride has been determined by measuring the chlorine quantity that the —COCl group releases by treatment with a dilute solution of ammonium hydrate in alcohol or tetrahydrofuran. In particular, 2.15% by weight of chlorine is released from the copolymer. This corresponds to a 5.49% by weight content of —CH$_2$—C(COCl)H— units in the copolymer.

Example 2

Example 1 is repeated, except that a pressure of 35 kg./cm.$^2$ is used. After 3 hours, 12 g. of a vinyl chloride-acrylyl chloride copolymer are discharged; by treatment with ammonium hydrate solution, 0.8% by weight of chlorine with respect to the copolymer is released: it corresponds to a 2.04% by weight content of —CH$_2$—(COCl)H— units.

Example 3

Into a 250 cc. rocking autoclave are introduced 5 g. of methyl alcohol, 1 g. of 10% (weight/volume) solution of tert.butyl monoperoxalate in n-pentane and 100 g. of vinyl chloride.

Carbon monoxide is then introduced into the autoclave until the pressure value reaches 105 kg./cm.$^2$ at a temperature of 25° C. After 3 hours, 8 g. of copolymer are recovered: its infrared spectrum exhibits, at 1733 cm.$^{-1}$, a strong band attributable to the carbonyl of an ester. The spectrum is identical with that of a vinyl chloride-methyl acrylate copolymer.

Example 4

A 250 cc. autoclave, stirring by tilting, is charged with 5 g. of methyl alcohol, 1 g. of a 10% (weight/volume) solution of sec.-butyl-tert.-butylperoxyoxalate and 100 g. of vinyl chloride.

Carbon monoxide is then introduced into the autoclave until the pressure reaches a value of 150 kg./cm.$^2$ at 40° C. After 4 hours, there are recovered 3 g. of a copolymer the infrared spectrum of which is identical with that of a vinyl chloride-methyl acrylate copolymer.

Example 5

20 g. of methylalcohol, 500 g. of vinylchloride and 0.5 g. of triethylboron are introduced into a 1 litre autoclave equipped with mechanical stirrer, previously deaerated and cooled to —40° C. 50 cc. of oxygen (measured under normal conditions) and carbon monoxide are introduced till a pressure of 20 kg./cm.$^2$ is reached. After 4 hours 2.4 g. of copolymer are recovered. The infrared spectrum of the above obtained copolymer is analogous to that reported in example 3 for the vinylchloride-methyl acrylate copolymer.

Example 6

5 g. of 2-ethylhexyl alcohol, 1 g. of a 10% (weight/volume) solution of tert.-butylmonoperoxalate in n-pentane, and 100 g. of vinyl chloride are introduced into a 250 cc. rocking autoclave.

Carbon monoxide is then introduced until a pressure value of 105 kg./cm.$^2$ at 25° C. is reached.

After 3 hours there are recovered 3.5 g. of copolymer exhibiting, in its infrared spectrum at 1733 cm.$^{-1}$ the band due to the carbonyl of an ester. Such spectrum is identical with that of a vinyl chloride-2-ethylhexyl acrylate copolymer.

The elementary analysis of the copolymer gives the following results:

Percent of C=41.9
Percent of H=5.4
Percent of Cl=51.0

The mol percent of 2-ethylhexyl acrylate units in the copolymers is as follows:

3.80 on the basis of the percent of C
3.70 on the basis of the percent of Cl.

Example 7

A 250 cc. rocking autoclave is charged with 5 g. of 2-ethylhexyl alcohol, 1 g. of a 10% (weight/volume) solution of tert.-butylmonoperoxalate in n-pentane, 50 g. of vinyl chloride and 50 g. of 1,2-dichlorotetrafluoroethane. Carbon monoxide is then introduced into the autoclave until the pressure reaches a value of 280 kg./cm.$^2$, the temperature being 25° C.

Aftrer 3 hours 2 g. of copolymer are recovered, whose infrared spectrum exhibits at 1733 cm.$^{-1}$ a band due to the carbonyl of an ester. Such spectrum is identical with that of a vinyl chloride-2-ethylhexyl acrylate copolymer. The copolymer contains 48.7% of chlorine, the percentage by weight of 2-ethylhexyl acrylate units in the copolymer being 14.3.

Example 8

Into a 250 cc. autoclave are introduced 5 g. of beta-phenylethylalcohol, 1 g. of a 10% (weight/volume) solution of tert.butylmonoperoxalate in n-heptane and 100 g. of vinyl chloride.

Carbon monoxide is then introduced till the pressure reaches 105 kg./cm.$^2$ at 25° C.

After 3 hours 2.9 g. of copolymer are recovered. The infrared spectrum shows a strong band at about 1733 cm.$^{-1}$ due to the carbonyl of an ester group.

The obtained copolymer contains 51.4% by weight of chlorine (determined by elemental analysis).

Example 9

Into a 250 cc. autoclave are introduced, at room temperature, 0.05 g. of benzoyl peroxide, 100 g. of vinyl chloride and carbon monoxide till the pressure reaches 100 kg./cm.$^2$.

The autoclave is heated to 70° C.: after a 34-hour polymerization under a pressure of 100 kg./cm.$^2$, 9 g. of vinylchloride-acrylyl chloride copolymer are recovered.

When treated with a diluted solution of ammonium hydroxide in tetrahydrofuran the copolymer releases 1.4% weight of chlorine, corresponding to 4.8% by weight of —CH$_2$—C(COCl)H— units in the copolymers.

1 g. of the above obtained copolymer is treated for 4 hours, at room temperature and under agitation, with 80 cc. of methylalcohol: the infrared spectrum of the thus obtained product is analogous to that reported in example 3 for the vinylchloridemethyl acrylate copolymer.

Example 10

5 g. of ethylene glycol, 1 g. of a 10% (weight/volume) solution of tert.-butylmonoperoxalate in n-heptane and 100 g. of vinyl chloride are introduced into a 250 cc. autoclave. Carbon monoxide is then introduced up to a pressure of 105 kg./cm.$^2$ at 25° C.

After 3 hours 2.5 g. of copolymer are recovered. The infrared spectrum of the above prepared copolymer shows a band at about 1733 cm.$^{-1}$ due to a carbonyl of an ester group. The copolymer is soluble in tetrahydrofuran.

Example 11

By operating under the conditions described in example 10, but using 0.5 g. of ethyleneglycol, 3.5 g. of copolymer are recovered after 3 hours.

The copolymer is only partially soluble in tetrahydrofuran.

Example 12

5 g. of 3-hydroxypropionic acid, 1 g. of a 10% (weight/volume) solution of tert.-butylmonoperoxalate in n-pentane and 100 g. of vinylchloride are introduced into a 250 cc. autolave.

Carbon oxide is then introduced up to a pressure of 80 kg./cm.$^2$ at 25° C.

After 4.5 hours, 2.2 g. of copolymer are recovered. The infrared spectrum of the copolymer shows a wide band (1700–1760 cm.$^{-1}$) due to carbonyls which belong both to ester groups and to —COOH groups.

The presence of the ester group is confirmed by the band at about 1165 cm.$^{-1}$, due to the stretching of the —C—O—C bond.

Example 13

50 g. of tetrahydrofuran, 2 g. of methyl alcohol, 2 g. of a 10% (weight/volume) solution of tert.-butylmonoperoxalate in n-pentane and 50 g. of vinylchloride are introduced into a 250 cc. autoclave.

Carbon oxide is then introduced until the pressure reaches 40 kg./cm.$^2$ at 25° C.

After a 7 hour polymerization the polymer is recovered by pouring the solution discharged from the autoclave on 500 cc. of methyl alcohol.

1.2 of copolymer are obtained. The infrared spectrum of the copolymer is analogous to that reported in example 3 (vinylchloride-methyl acrylate copolymer).

As shown by the foregoing illustrative working examples, the present invention provides a new and economically desirable process for producing, from starting mixtures of vinyl chloride, carbon monoxide and a compound containing alcoholic functions, copolymers which are identical (as shown by the IR spectral) with copolymers obtained by subjecting starting mixtures of vinyl chloride and acrylic esters to copolymerization conditions.

(a) As shown in present Examples 1 and 2, the product normally obtained by reacting vinyl chloride and carbon monoxide under given conditions is a copolymer of vinyl chloride and acrylyl chloride containing units derived from vinyl chloride and

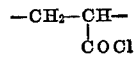

units. In order to obtain a copolymer containing units of vinyl chloride and units of an acrylic acid ester, it is necessary to after-treat the vinyl chloride/acrylyl chloride copolymer produced initially with a compound containing alcoholic functions corresponding to the acrylic acid ester desired, (b) The copolymers obtained by the present process have the same known utility as the corresponding copolymers obtained starting with the mixed monomers, vinyl chloride and acrylic acid esters.

As will be apparent, various changes in details may be made in practicing the invention without departing from its spirit. Therefore, we intend to include in the scope of the appended claims all such modifications as will be obvious to those skilled in the art from the description and working examples given herein.

What is claimed is:

1. A process for preparing copolymers of vinylchloride and acrylic esters, which process comprises copolymerizing, at a temperature of from —40° C. to +70° C. and a pressure of from 5 kg./cm.$^2$ to 300 kg./cm.$^2$, and in contact with a radicalic initiator, a mixture of vinylchloride, carbon monoxide and from 0.2% to 20% by weight on the vinyl monomer weight of a compound containing alcoholic functions.

2. The process according to claim 1, characterized in that the compound containing alcoholic functions is a mono- or poly-hydric alcohol.

3. The process according to claim 1, characterized in that the compound containing alcoholic functions is a hydroxy acid.

4. The process according to claim 1, characterized in that the copolymerization is carried out in the presence of an inert diluent of the monomer from which the polymer precipitates.

5. The process according to claim 1, characterized in thta the copolymerization is carried out in the presence of a solvent in which the monomer is partially or completely soluble.

6. The process according to claim 1, characterized in that the copolymerization is carried out in the absence of a solvent.

7. A process for preparing copolymers of vinylchloride and acrylic acid esters, which comprises first copolymerizing a vinylchloride-carbon monoxide mixture at a temperature of from —40° C. to +70° C. and at a pressure of from 5 kg./cm.$^2$ to 300 kg./cm.$^2$, and in contact with a radicalic initiator, and then reacting the obtained copolymer with a compound containing alcoholic functions in an amount of from 0.2 to 20% by weight on the weight of the vinyl monomer.

References Cited

UNITED STATES PATENTS 2,762,720  9/1956  Michel _____ 117—65
3,004,009  10/1961  Dell _____ 260—86.3

JOSEPH L. SCHOFER, Primary Examiner

J. KIGHT, III, Assistant Examiner

U.S. Cl. X.R.

260—63 R, 86.3

UNITED STATES PATENT OFFICE
CERTIFICATE OF CORRECTION

Patent No. 3,823,116        Dated July 9, 1974

Inventor(s) Lorenzo RATTI et al

It is certified that error appears in the above-identified patent and that said Letters Patent are hereby corrected as shown below:

Col. 1, line 9 under "The Present Invention", "ethylenes glycol" should be - - - ethylene glycol - - -.

Col. 3, Example 2, line 7, the formula " $-CH_2-(COCl)H-$ " should be - - - $-CH_2-C(COCl)H-$ - - -.

Col. 4, Example 7, line 8, "Aftrer" (1st word) should be - - - After - - -.

Col. 5, Example 13, line 10, the abbreviation - - - g. - - - should appear after "1.2";

Example 13, line 18, "spectral" should be - - - spectra - - -.

Col. 6, line 2 of Claim 5, "thta" should be - - - that - - -.

Signed and sealed this 31st day of December 1974.

(SEAL)
Attest:

McCOY M. GIBSON JR.
Attesting Officer

C. MARSHALL DANN
Commissioner of Patents